United States Patent [19]

Laws et al.

[11] 4,218,491

[45] Aug. 19, 1980

[54] HOP EXTRACTION WITH CARBON DIOXIDE

[75] Inventors: Derek R. J. Laws, Bexleyheath; Nigel A. Bath, London; Colin S. Ennis, Chislehurst; Alfred G. Wheldon, Galley Wood, all of England

[73] Assignee: The Brewing Research Foundation, England

[21] Appl. No.: 870,084

[22] Filed: Jan. 17, 1978

[30] Foreign Application Priority Data

Jan. 18, 1977 [GB] United Kingdom ............... 1944/77

[51] Int. Cl.$^2$ .......................... C12C 3/00; C12C 9/02
[52] U.S. Cl. ................................. 426/600; 426/655; 426/429
[58] Field of Search ................. 426/429, 600, 16, 11, 426/655

[56] References Cited

U.S. PATENT DOCUMENTS 3,979,527  9/1976  Laws et al. ...................... 426/592

FOREIGN PATENT DOCUMENTS 4844864  12/1970  Japan.
1388581  3/1975  United Kingdom.

*Primary Examiner*—David M. Naff
*Attorney, Agent, or Firm*—Wenderoth, Lind & Ponack

[57] ABSTRACT

A method of preparing a hop extract is described in which liquid carbon dioxide is passed at a temperature of from $-5°$ C. to $+15°$ C. through a column of hop material to extract $\alpha$-acids contained therein. The method gives a primary extract which is of much higher purity than has been previously described particularly in comparison to presently commercially available solvent extracts.

9 Claims, 4 Drawing Figures

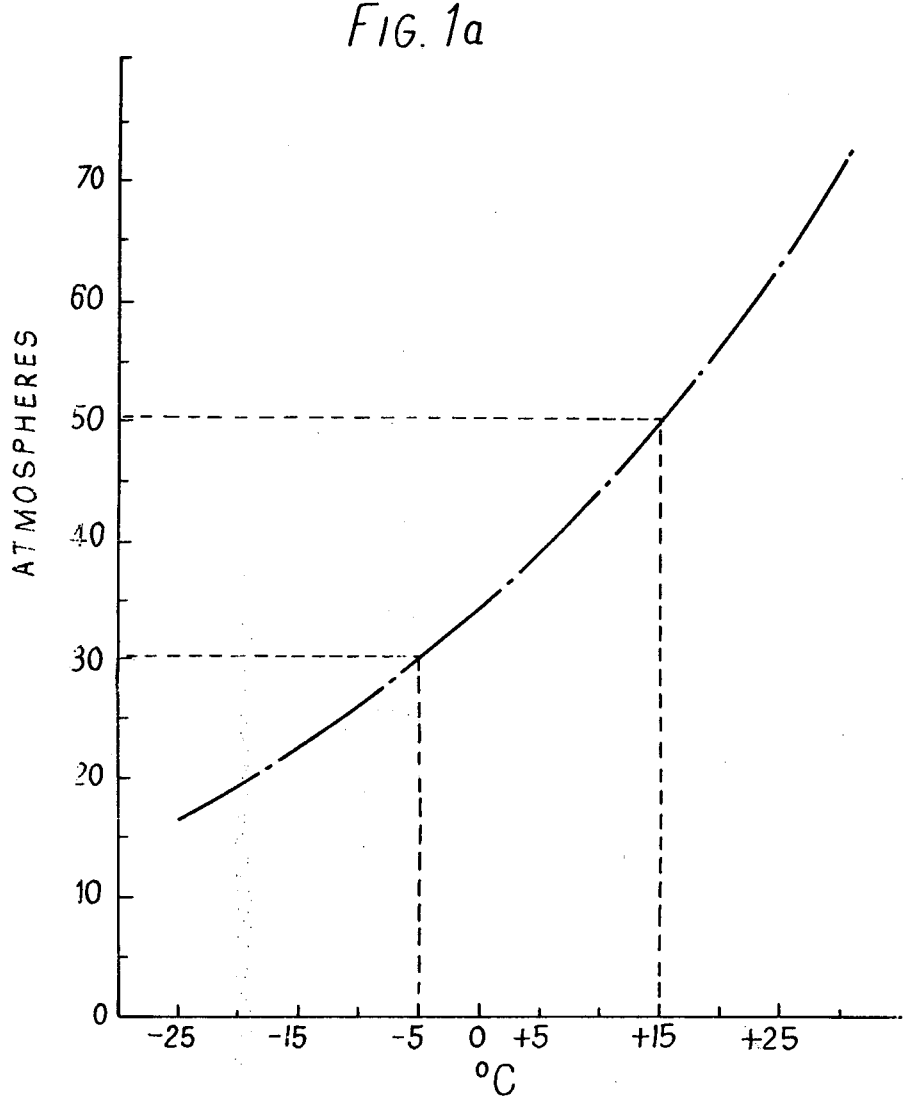

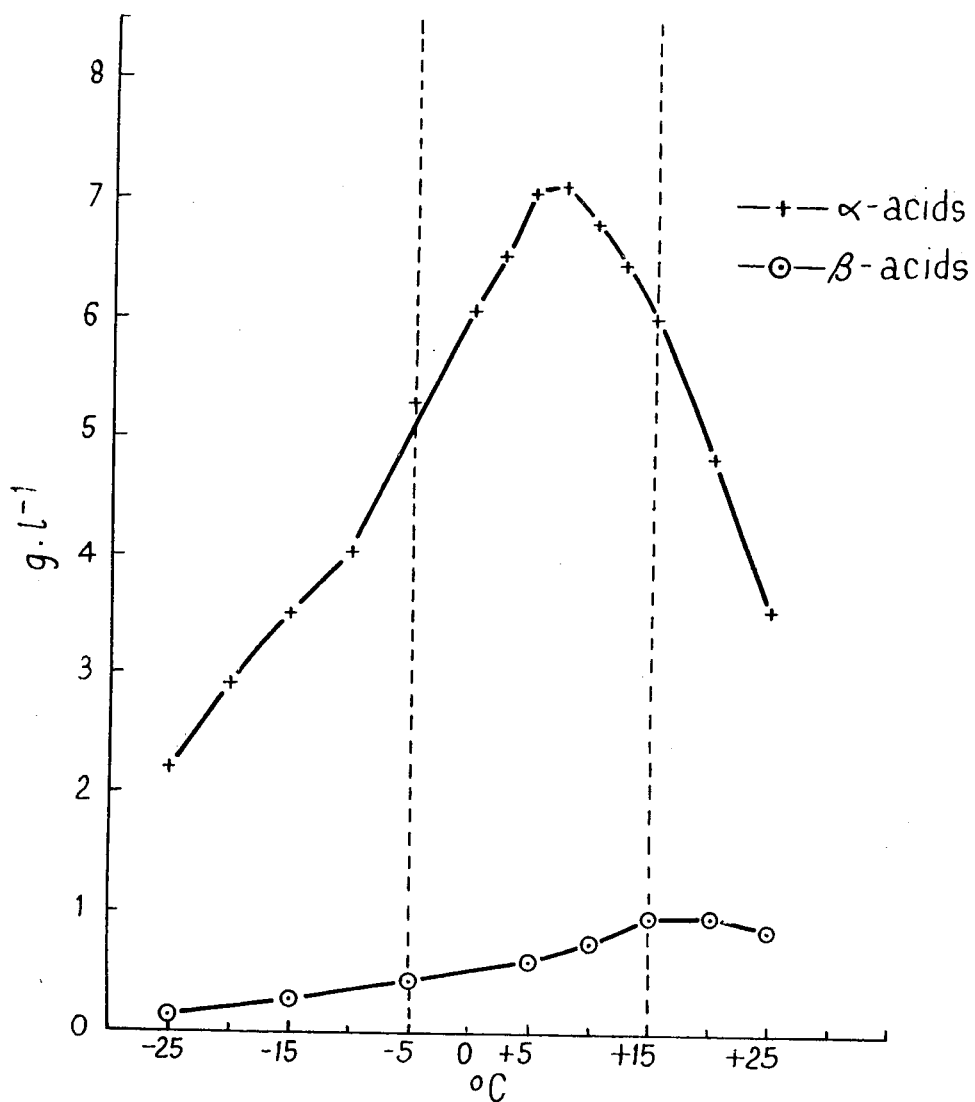

HOP EXTRACTION WITH CARBON DIOXIDE

This invention relates to the extraction of hops and more particularly to extracting a high quality α-acid fraction of the soft resins of hops which is suitable for use in beer making.

It is common practice to extract various constituents from hops and to use these extracted constituents in place of hops themselves in making beer. The principal constituents which have been so extracted previously are the resins and in particular the α-acid fraction of the soft resins which on chemical rearrangement give iso-α-acids which are the main bittering components of beer. The main advantage of extracting α-acids is that the α-acids can be used much more efficiently than is possible in traditional beer making. In traditional beer making typically only 25% to 35% of the α-acids in the original hops are utilized. By extracting the α-acids, isomerizing them separately from the beer and adding the iso- α-acids produced to beer after fermentation α-acid utilization can be much higher, typically from 60% to 85%. A further substantial advantage in using extracts is that they can be stored for longer periods without the, presumably oxidative, degradation especially of the bitter principles including the α-acids that occurs in hops under extended storage.

Conventional hop extraction procedures involve the use of organic solvents such as methylene chloride, trichloroethylene, hexane and/or methanol. These solvents will readily dissolve not only the desired α-acids but relatively large proportions of β-acids, tannins, chlorophyll and various other hop constituents.

A primary extract made by extracting hops with an organic solvent would typically have the following composition:

|  | wt % |  | wt % |
|---|---|---|---|
| α-acids | 8–45 | tannins | 0.5–5 |
| β-acids | 8–20 | chlorophyll | up to 1 |
| uncharacterized soft resins | 3–8 | fines (cellular debris) | 2–5 |
| hard resins | 2–10 |  |  |
|  |  | inorganic salts | 0.5–1 |
| hop oil | 1–5 |  |  |
|  |  | residual solvent |  |
| fats and waxes | 1–2 | (usually $CH_2Cl_2$ or $CH_3OH$) | 0.5–2.2 |
| total resins | 15–60 | water | 1–1 |

These figures are based on analyses for the resins performed by the method described in Analytica EBC, published by Schweizer Brauerei Rundschau, 3rd Edition, 1975, page E49 and analyses for the non-resin components especially the tannins and chlorophyll by the method described by J. Jerumanis in Bulletin Association Anciens Etudiants Brasserie Louvain, 1969, volume 65, page 113.

To obtain high quality α-acids suitable for isomerization the crude extract has to be extensively purified, often involving other organic solvents and invariably involving many and often complex steps. Further it is difficult to entirely remove the organic solvent from the extract; commercial extracts can contain over 1% by weight solvent. Whilst it is believed that residual solvents particularly of methylene chloride and methanol are lost entirely during beer making, it is not a wholly satisfactory position to rely on such 'accidental' elimination of possibly noxious materials during production of a foodstuff. Further, although there is at present no great technical difficulty in meeting the public health requirements for levels of residual solvents there may well be considerable difficulties in the future.

Fluid carbon dioxide either in the form of the liquid or the supercritical gas has been suggested as an extraction medium for hops. Thus, British Patent Specification No. 1388581 describes a method of making a hop extract by extracting hops with a variety of gases in the supercritical state with respect to temperature and pressure. Carbon dioxide is stated to be the most preferred gas. Extraction under such supercritical conditions with $CO_2$ typically yields an olive-green pasty product which contains α-acids, β-acids, uncharacterized soft resins, hard resins and small quantities of tannins. The extraction conditions can be varied to give yields of α-acids proportionately higher than the concentrations in the starting hops; the best extracts described, however, containing only about one-third α-acids. The optimum extraction conditions are stated to involve extraction under a pressure substantially in excess of the critical pressure, which for $CO_2$ is about 72.8 atmospheres, preferably in excess of 100 atmospheres (gauge) and temperatures of from 40° to 50° C.

The extract as described in specification No. 1388581 compares favourably with typical primary extracts obtained using organic solvents and would appear to be suitable for use in brewing beer e.g. by addition to the kettle. However, the extract described would not be suitable for isomerization without considerable purification to remove components which would produce adverse flavours under typical isomerization conditions. In the present state of extract technology, such purification would require the use of organic solvents, thus giving up one of the main advantages (freedom from solvent residues) of using supercritical $CO_2$ in extracting hops.

Liquid $CO_2$ is described as an extraction medium for hops in USSR Author's Certificate No. 167798 in the name of Pekhov, Ponamarenko and Prokopchuk and by Pekhov in MasloboinoZhirovanaya Promyshlemnost Vol. 34, part 10 (1968) pages 26 to 29. The product obtained by extraction of hops with liquid $CO_2$ to 20° to 25° C. is stated in the Author's Certificate to be a light brown viscous mass which as described later might be due to iron contamination. The purity and stability of such $CO_2$ extracts is not altogether certain. It may be possible to use them in beer making by addition to the kettle.

Shafton and Naboka in ISU Sev-Kauk Nauchn Tsentra UGssh Shk, Ser Tekh Nauk 1975, 3(3), 29-31 [Chem Abs Vol 84 (1976) 120046 a ] referring to the work of Pekhov et al describe the extracts of hops as complex mixtures of α-, β- and γ-acids, α-, β- and γ-soft resins and hard resins which are subjected to substantial deterioration, especially by fairly rapid autoxidation on storage. It is clear that such extracts could not be isomerized to give an iso-α-acid preparation without substantial purification and, in any event, are considerably less stable under storage than conventional hop extracts made using organic solvents.

The present invention accordingly provides a method of making a hop extract (of high purity) which method comprises passing liquid carbon dioxide through a column of hop material at a temperature of from −5° C. to +15° C. to extract at least a portion of the α-acids contained in the hops into the liquid carbon dioxide and subsequently recovering a hop extract of high purity from the liquid carbon dioxide.

In the practise of the present invention the high purity primary hop extract obtained generally contains $\alpha$-acids, $\beta$-acids, hop oil, usually small quantities of water and normally no more than trace quantities of the main impurities seen in primary organic solvent extracts viz:- uncharacterized soft resins, hard resins, tannins and chlorophyll. However, where the hops are stale detectable quantities of such impurities may appear in the extract.

The main components of the extract $CO_2$ of the present invention are as indicated above, $\alpha$-acids, $\beta$-acids and hop oil. The extract typically has the following composition in respect of these components:

| | |
|---|---|
| $\alpha$-acids | 40 to 75, usually 40 to 65 |
| $\beta$-acids | 20 to 40, usually 25 to 35 |
| total resins (including $\alpha$- and $\beta$-acids) | 70 to 98, usually 80 to 95 |
| hop oil | up to 10, usually up to 3 |
| water | up to 5, usually 2 to 5 |

Table 1 sets out the purity of the primary extract as measured by the quantities of the impurities which interfere with the subsequent use of the extract acid in particular with isomerization. Column A gives the maximum permissible proportion of the impurities, Column B gives the expected maximum proportion of the impurities extracted by liquid $CO_2$ by the process according to the invention and Column C gives figures typical of what we expect to obtain in a typical operation.

Table

| Impurity | Amount of Impurity wt. % on extract | | |
|---|---|---|---|
| | A | B | C |
| uncharacterized soft resins | 5 | 1.0 | <0.1 |
| hard resins | 0.5 | 0.1 | none |
| Tannins | 0.5 | 0.1 | none |
| Chlorophyll | 0.2 | 0.1 | none |
| fats and waxes | 0.2 | 0.1 | <0.1 |
| fine solids | 0.5 | none | none |
| inorganic salts | 0.5 | 0.1 | <0.1 |
| Total % | 4 | 1.5 | 0.1 |

The positive figures in Column C indicate that with some primary extracts the impurities were qualitatively just detected with the Analytical techniques used but that the amounts were too small to be estimated with any degree of accuracy.

Where we refer herein to the extract as being of high purity we mean that undesired impurities are present in quantities less than those given in column A of Table 1. Under the conditions, as set out herein, under which we have extracted hops with liquid $CO_2$ we have obtained results where the impurity levels are much lower than the figures given in column A.

The amount of water present in the extract is not, in itself, critical. The amount of water in the extract depends on the amount present in the hops and thus, whilst the figures given above are typical, amounts outside the range indicated may be obtained in some circumstances and are not objectionable.

The high quality primary extract has the golden yellow colour of $\alpha$-acids and, at ambient temperature is usually a solid or semi-solid crystalline material, the exact form depending on the particular conditions of extraction and the variety (cultivar) of hop extracted. A further indication of the purity is that typical primary extracts separate identifiable crystals of $\alpha$- and $\beta$-acids on cooling to ca. 4° C. Conventional primary solvent extracts show no signs of such crystallization.

It will be noted that this primary extract is a very much cleaner material than typical organic solvent primary extracts and especially with regard to the hard resin, tannins and fatty and waxy components and is substantially purer than conventional organic solvents extracts and therefore lends itself to isomerisation without further purification.

The extract can be used to bitter beer by addition to the kettle at the start of wort boiling. The resulting beers are of clean flavour and have a normal shelf-life.

The processes involved in the extraction of hops with liquid $CO_2$ are complex. The materials extracted from the column of hops are removed at different rates depending on the temperature and the amounts of other extractables present. Generally the hop oil is the first material to come off the column, followed by $\beta$-acids, followed by $\alpha$-acids. Although this general order is followed the individual components do not come off the column as separated fractions. It is nevertheless possible to obtain fractions at the outlet of the extractor which are respectively relatively richer in hop oil, $\beta$-acids and $\alpha$-acids. The finding that the $\beta$-acids are at least initially preferentially extracted as compared with the $\alpha$-acids is surprising because $\alpha$-acids are more soluble in liquid $CO_2$ than $\beta$-acids at the temperatures used for extraction. Despite this we have found that generally it is possible ultimately to extract a higher proportion of $\alpha$-acids than $\beta$-acids. The reasons for these phenomenaare not clear and it would seen that complex adsorption - desorption reactions take place during the extraction.

At the temperatures used in the process of the invention after the bulk of the hop oil, $\beta$-acids and $\alpha$-acids have been removed other components of the hops, in particular the fat and waxes, may be extracted. Since these materials are undesired the extraction is not carried beyond the point at which this occurs. This point is readily detected by the appearance of oily droplets of methanol - insoluble material in the extract. We have found that at temperatures below −5° C. the fats and waxes are extracted whilst substantial and commercially valuable amounts of $\alpha$-acids remain unextracted. This means that to operate to commercially acceptable levels of extraction of $\alpha$-acids an impure product results. The lowest temperature at which commercial operation is practical to produce a high quality extract is −5° C. and it is preferred that the extraction temperature is not as low as this. One factor which seems to affect the relatively early appearance of the fats and the waxes is that the rate of extraction particularly of the $\alpha$-acids is considerably slower at these low temperatures. The solubility of $\alpha$-acids falls off fairly rapidly below −5° C. and this appears to be a contributory factor to the slower extraction of $\alpha$-acids at temperatures below −5° C.

Extracts made at such low temperatures including fats and waxes aregenerally oily liquids at ambient temperatures and may remain liquid even at 0° C. The pure extracts made according to the invention are usually solid or semi-solid at ambient temperature.

If extraction is attempted at temperatures higher than 15° C. then several factors combine to make this technically disadvantageous. The rate at which 60-acids are extracted is slower than in the temperature range used in the invention. This is believed to be a result of the diminished solubility of α-acids in liquid $CO_2$ at such higher temperatures. The solubility of α-acids in liquid $CO_2$ (see FIG. 1) shows a peak at about +7.5° C. (7.1 g.l$^{-1}$), falling off to only 4.0 g.l$^{-1}$ at −10° C. and 3.6 g.l$^{-1}$ at +25° C. We have found that faster extraction of α-acids can be obtained in the temperature range −5° C. to +15° C. than at higher temperatures e.g. +20° C. to +30° C. or at lower temperatures as described above. The higher solubility seems to be a contributory factor in this improvement in the extraction of α-acids. The solubility of β-acids also exhibits a peak, at a temperature in the region between +15° C. and +20° C. as shown in FIG. 1.

A factor which is very important practically relates to the pressure under which the extraction is done. Clearly for the carbon dioxide to remain in a liquid, the pressure in the system cannot be less than the vapour pressure of $CO_2$ at the temperature within the system. Thus, the higher the temperature at which the extraction is performed the higher the pressure that the extractor must be capable of withstanding. The capital cost and complexity of and the difficulty in maintaining pressure equipment of the kind used in performing the method of extraction of the invention is directly related to the pressures under which it has to operate and it is thus advantageous to operate at sub-ambient temperatures in order to take advantage of the possible reduction of operating pressure. Operating at sub-ambient temperatures involves the use of refrigeration equipment and thermal insulation which is not necessary for operation at ambient temperature. The lower the extraction temperature the more expensive is this additional equipment. The relationship of vapour pressure and the solubilities of α-acids and β-acids as functions of temperature are illustrated in FIG. 1.

The outside limits on the temperature of extraction in the present invention are −5° C. and +15° C. The preferred temperature depends on the particular technique adopted and in particular for the isolation of the extract. We envisage that isolation will be achieved by evaporating or boiling off the liquid $CO_2$. This evaporation is preferably done under approximately constant pressure conditions to avoid difficulties associated with freezing which can arise if the pressure is simply released to give adiabatic evaporation. Adiabatic evaporation is not appropriate for large scale production because it makes it impractical to re-circulate the carbon dioxide. We have successfully tried two differing techniques for arranging the evaporation and for each technique the optimum operating conditions are slightly different.

In the first technique the isolation of the extract is effected in a heated evaporator e.g. heated by water at 30° to 40° C. to evaporate the liquid $CO_2$. The effective temperature of the $CO_2$ extract in the evaporator in this technique will not usually rise above 15° C. At these temperatures and under the pressure in the apparatus the extract is conveniently liquid. At significantly lower temperatures and in particular below 0° C. the extract tends to become viscous or solid and it may block the evaporator. Using this kind of evaporator the extraction may conveniently be run at a temperature in the range −5° C. to +5° C. and in particular about 0° C.

In the second technique, the gaseous carbon dioxide from the evaporator is subsequently condensed and recycled through the column of hops. When the carbon dioxide is recycled in this way it is advantageous to use the heat obtained from the condenser in the evaporator e.g. by using a heat pump. In this kind of system it is preferred to operate with as nearly as possible a constant temperature throughout the circulating system in order to operate at a high thermal efficiency. It is, thus, preferable to operate at somewhat higher temperatures than are preferred in the first method described above despite the increase in pressure. In this technique the preferred extraction temperature is about 10° C. (e.g. between 9° and 12° C.). At this temperature the extract is obtained in a sufficiently fluid form not to block the evaporator and the extraction temperature corresponds approximately to the peak solubility of α-acids in liquid $CO_2$. This seems to favour slightly quicker extraction. Additionally performing the evaporation at a temperature of at least 10° C. prevents any difficulty arising from the formation of solid carbon dioxide hydrate ($CO_2 \cdot 8H_2O$) in the evaporator. At the pressures used carbon dioxide hydrate may form as a solid in the evaporator if the temperature is less than its melting point of about 10° C.

There will generally be a small temperature gradient through the extraction column even where the column is thermally insulated. Positive refrigeration of the column does not seem to be necessary, the temperature of extraction being set by the liquid $CO_2$ introduced into the column. However, care may need to be taken to prevent boiling of the liquid $CO_2$ within the column.

The pressure at which the hops are extracted is not particularly important although it must clearly be sufficient to keep the $CO_2$ liquid. The pressure at the outlet of the extraction column will generally be at or near to the vapour pressure of the liquid $CO_2$ at the temperature at the outlet. A small excess pressure may be maintained at the outlet in order to prevent the liquid $CO_2$ boiling in the extraction column itself. At practical flow rates through a column of hops there is a pressure drop across the column itself and the pressure at the inlet to the extraction column will thus be higher than at the outlet of the column. The flow of liquid $CO_2$ through the column can be readily maintained e.g. by pumping. In a vertical column there will also be a hydrostatic pressure difference between the inlet and outlet but this will generally be less than that required to maintain adequate flow.

The gaseous $CO_2$ from the evaporator can be vented from the extraction apparatus e.g. via a valve giving a constant pressure drop or, since the quantities of $CO_2$ involved are substantial, the $CO_2$ can be re-condensed and re-cycled through the extraction column as is described in more detail below.

As is set out above, apart from water, the extract produced by the method of the invention consists essentially of α-acids, β-acids and hop oil. The relative proportions of these three components and the amount of each component extracted from the amount available in the hops are a function of the type of hop employed and the extraction conditions.

The proportion of α-acids present in the hops which can be extracted with liquid $CO_2$ according to the invention is at least equivalent to the proportions extracted in typical organic solvent extraction processes. We have not experienced any substantial difficulty in extracting more than 95% of the available α-acids and in some cases we have successfully extracted 100% under laboratory conditions, without significant appearance of fats, waxes or tannins. We expect that extraction on a commercial scale can be performed to give overall extraction of 90% or more of the available α-acids. As has been set out above the rate at which α-acids are extracted by liquid $CO_2$ is a function of temperature. The rate is also a function of the liquid $CO_2$ flow rate. As a guideline we have found that at 0° C. and with a flow rate of about 7 kg liquid $CO_2$ hr per kg hops, 90% of the available α-acids can be extracted from a 2.5 kg hop column is typically between 2 and 3 hours. We expect that extraction on a commercial scale could be performed at least at a comparable rate.

The extract includes some hop oil and may include substantially all (90%+) of the available oil. Since hop oil can be a valuable product it can be removed from the primary extract by steam distillation under vacuum, e.g. under the general conditions of temperature and pressure set out in U.S. Pat. No. 3979527 to Laws and Pickett. Thus, conveniently the separation can be effected by mixing the extract with water and distilling the mixture under vacuum at a temperature of less than 50° C. typically from 20° to 25° C. The distillate, an emulsion of hop oil in water, can be collected as a dispersion in ice by cooling the vapour to $-20°$ C. or below. Hop oil distilled from the extract in this way can be used to impart hop aroma and flavour to beer. In any event, the liquid $CO_2$ extract will contain at least some hop oil components and these should be substantially removed from the extract if it is intended to isomerise the α-acids because the degradation product of hop oil components can contribute to off-flavours and aromas in beer. This can be done either previous to isomeration (by specifically steam distilling all the hop oil off.) or in the course of isomerisation in which the extract is boiled with alkali.

The shape and configuration of the vessel within which extraction takes place does not seem to be critical insofar as satisfactory extraction can be obtained in a variety of vessels. However, we expect that commercial extraction will be performed in a cylindrical column. Further, in order to maximize contact time without unduly slowing the rate of flow the column will normally have a high length to diameter ratio. The maximum value of this ratio is effectively limited by practical considerations of size, viscosity and pressure differences within the extraction apparatus. A ratio of between 4 to 1 and 50 to 1 seems to be appropriate. The column is preferably vertical and the liquid $CO_2$ can be passed through the hops in the column in an upward or downward direction. We have found it more convenient to use upward flow of the liquid $CO_2$ through the column.

In normal commercial operation the apparatus will include parallel extraction columns in order to effect extraction continuously. By switching the flow of liquid $CO_2$ from one column to another in parallel a column containing spent hops may be emptied and replenished with fresh hops while extraction of hops in a parallel column is continued.

The form of hops charged to the extractor column is not especially critical. High quality extracts can be made from both green and dried hop cones, and from powdered or pelletted dried hops. However, the bulk density of hop cones is very low and as a practical matter it is preferred to use powdered hops in the extraction. Of course, the hop material should be of suitably high quality. Inferior or deteriorated hop material may not produce extracts of high purity.

The particular type (variety) of hop used does not seem to be critical to the extraction itself and both seeded and seedless hops can be satisfactorily extracted. The particular composition of the extract and the yield obtained is a function of the hop variety and whether it is seeded or seedless. We have produced satisfactory extracts from the following hop varieties: Wye Northdown, Wye Saxon, Northern Brewer, Wye Challenger, Bullion, Comet, Pride of Ringwood, Wye Target, Styrian Golding and Hallertau Mittlefruh.

We have found that the hop extract will readily form complexes with some heavy metals and in particular iron. This is particularly true of the extract after evaporation of $CO_2$, when it readily picks up iron from e.g. iron metal or mild steel with which it comes into contact particularly in the presence of moisture. The extract, before evaporation of liquid $CO_2$, seems less reactive in this respect. The pick up of iron is undesirable because it could give rise to corrosion problems in the apparatus and contaminates the product. The presence of iron in the extract is highly disadvantageous because even in small amounts it can cause deterioration of the extract. The iron appears to catalyse condensation reactions in the extract even in the absence of oxygen. In the presence of oxygen it seems to reduce the resistance of the extract to oxidative degradation. Iron-containing extracts are typically brown or black in colour rather than the yellow of the pure extract.

The problem of contamination by iron can be overcome by using suitably inert materials in the construction of the extraction apparatus. We have found that making the extraction equipment (in particular the evaporator and extraction column (s)) primarily of stainless steel e.g. stainless steel 316, a stabilized 18/8 stainless steel, glass (for viewing parts) and inert plastics materials overcomes this problem. It is possible to line the equipment with plastics or by electroplating.

It seems probable that the extracts obtained by the prior art investigators particularly Pekhov et al mentioned above are contaminated with heavy metal ions such as iron as is indicated by their brown colour and their apparent instability with respect to oxidation as discussed by Shaftan and Naboka. We have experienced no difficulty in making extracts which have the yellow colour of α-acids and which are much more stable than those discussed by Shaftan and Naboka. Some of our liquid $CO_2$ extracts have shown no substantial signs of oxidative or other degradation during storage even at ambient temperature in air over a period of at least 14 months.

In a particularly advantageous form the invention provides a method of making a stable hop extract of high quality which method comprises passing liquid carbon dioxide through a column of hops at a temperature of from $-5°$ C. to $+15°$ C. preferably at about 10° C., evaporating the liquid carbon dioxide to obtain an extract of high purity in an inert vessel, condensing the evaporated carbon dioxide and recycling the liquid carbon dioxide through the hops to continue the extraction until at least a substantial proportion, preferably at least 70%, of the α-acids present in the hops are extracted but halting the extraction of the said column of hops before any substantial amount of undesired impurities are extracted from the hops.

The invention will be described further with reference to the accompanying drawings, in which:

FIGS. 1a and b are graphs of the vapour pressure of $CO_2$ and the solubility of α-acids and β-acids in liquid $CO_2$ as a function of temperature.

The graphs in FIGS. 1a and b are presented to illustrate the discussion on the temperature limits on the invention discussed in detail above.

Figure 2:
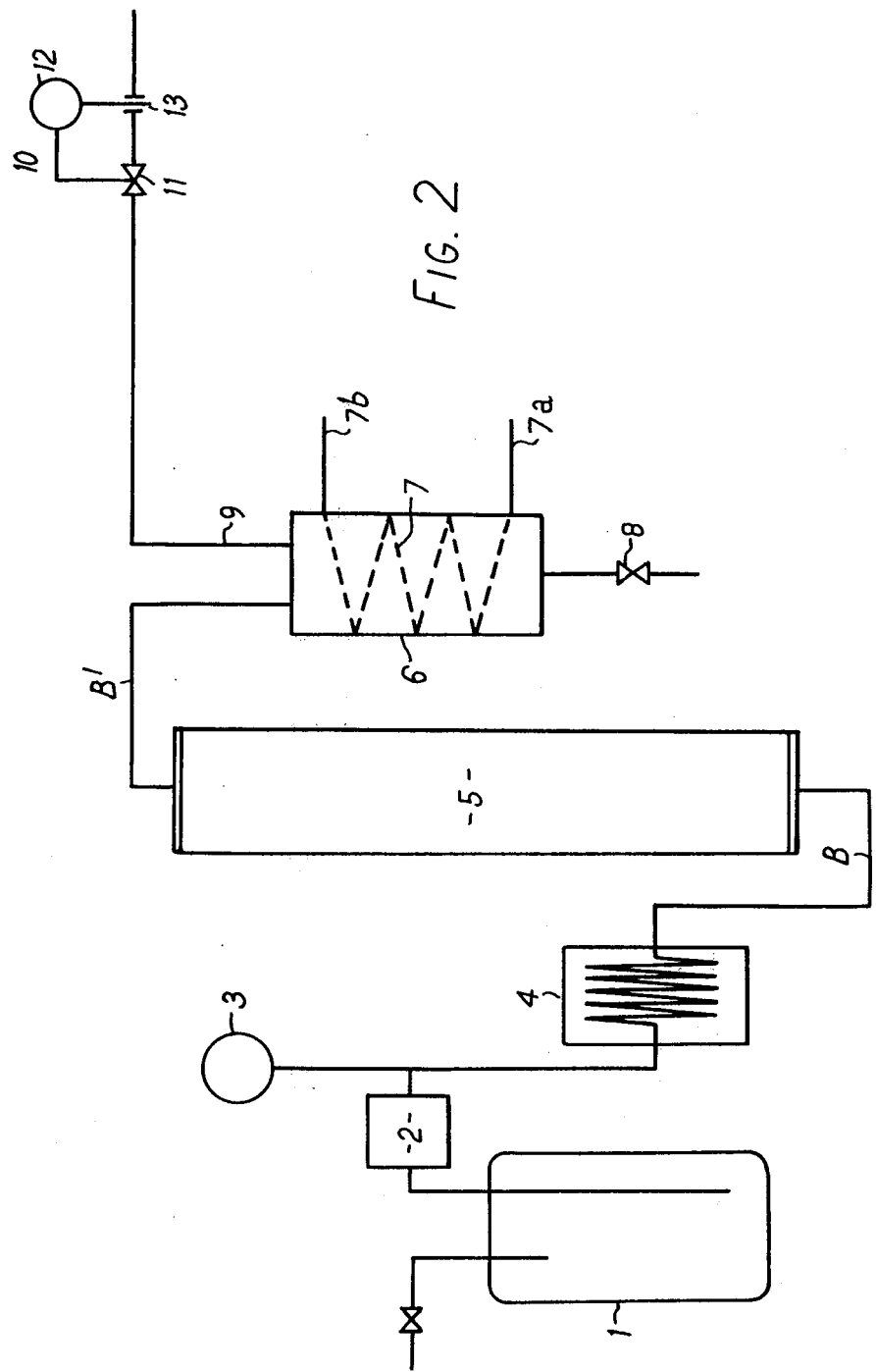
FIG. 2 is a diagram showing apparatus suitable for producing an extract according to the invention without recycle of the $CO_2$.

In FIG. 2, liquid $CO_2$ in storage tank 1 is pumped by pump 2 at a pressure monitored by indicator 3 through heat exchanger 4 in which the temperature of the liquid $CO_2$ is adjusted to that desired for extraction. In a commercial extractor the storage tank 1 will normally be refrigerated to a temperature of between $-15°$ C. and $-20°$ C.

From the heat exchanger 4 the liquid $CO_2$ is passed through the vertical extraction column 5 containing hops in suitable form e.g. as a powder or crushed pellets.

The temperature of the liquid $CO_2$ at the outlet of the heat exchanger 4 is conveniently slightly below the actual temperature of extraction to compensate for the absorption of heat during passage of liquid $CO_2$ through the extraction column. To minimise such undesired heat transfer to the liquid $CO_2$, the extraction column 5 and associated pipework, valves etc. will normally be lagged to give a suitable degree of thermal insulation. With a suitably insulated column the liquid $CO_2$ entering from heat exchanger 4 will not usually need to be more than about $2°$ or $3°$ cooler than the desired extraction temperature.

Although only one extraction column is illustrated in FIG. 2, others may be placed in parallel with it e.g. between B and B' and by switching the flow of $CO_2$ through such a plurality of columns it is possible to run the apparatus semi-continously as already explained.

From the hop of the extraction column 5 the liquid $CO_2$ is fed to an evaporator 6 where the $CO_2$ is boiled off through pipe 9. The evaporator is heated e.g. by warm water entering a coil 7 at 7a and leaving at 7b. For an extraction at $0°$ C. this warm water can conveniently be at $40°$ C. Other temperatures for the heating medium may be appropriate for other extraction temperatures in order to ensure adequate heat transfer and to avoid isolation of the extract at a temperature so low that it is very viscous or solid or so high that it may be degraded or decomposed. The extract, which will typically be a liquid at the temperature within the evaporator, is collected within the evaporator or a collecting vessel connected thereto and can be removed from time to time via tap 8.

As illustrated in FIG. 2, the gaseous $CO_2$ in pipe 9 is vented to atmosphere through controlled valve 10. This comprises a controllable e.g. motorised, valve 11 and a pressure difference detector 12 measuring the pressure drop between the upstream side of valve 11 and orifice plate 13. The controlled valve is automatically adjusted to maintain a constant pressure drop thus controlling the flow of $CO_2$ through the system. Other types of controlled venting may be used. The supply of liquid $CO_2$ in tank 1 can be replenished via valve 14.

Figure 3:
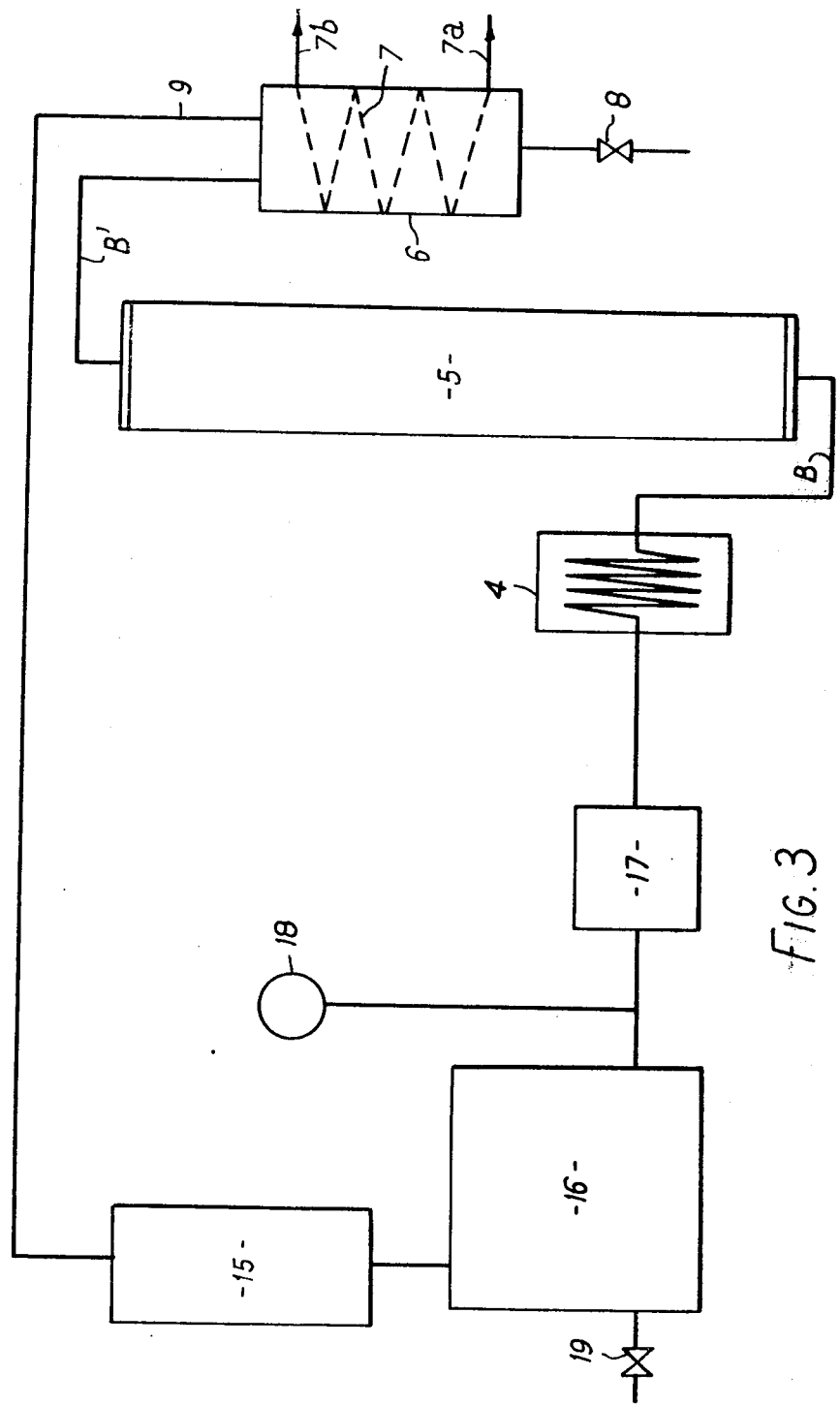
FIG. 3 is a diagram showing extraction apparatus involving the re-cycling of the $CO_2$.

The apparatus illustrated in FIG. 3 is in most respects closely similar to that of FIG. 2. The heat exchanger 4, extraction column(s) 5 and evaporator 6 are substantially as described with reference to FIG. 2. The main difference is the provision for re-cycling the $CO_2$. The gaseous $CO_2$ coming from the evaporator 6 at outlet 9 is, instead of being passed to a venting valve, passed to condenser 15 in which the gaseous $CO_2$ is cooled to reliquefy it. The liquid $CO_2$ is passed to storage tank 16.

From tank 16 the liquid $CO_2$ at a pressure monitored by pressure indicator 18 is pumped by pump 17 through heat exchanger 4 and thus re-cycled through column 5 to evaporator 6. Fresh liquid $CO_2$ can be introduced into the circuit via valve 19 to replace $CO_2$ lost when removing extract via valve 8 or when refilling extraction columns.

However in the apparatus illustrated in FIG. 3 it is particularly convenient that the evaporator 6 and the condenser 15 and heat exchanger 14 are operated as a heat pump. When this is done the extraction temperature will usually be about $10°$ C.

The following Examples illustrate the invention.

EXAMPLE 1

Extraction of Hops including re-cycling of $CO_2$ 2.0 Kg of powdered Wye Saxon hops containing 8.9% of $\alpha$-acids were placed in the column (5 cm ID × 180 cm) of a semi-continuous extraction apparatus generally as illustrated in FIG. 3. Liquid carbon dioxide was circulated through the system at a rate of 6.5 liters/hour for 3 hours. The temperature of the liquid carbon dioxide inside the column was about $-5°$ C. After 3 hours 282 g of extract had been obtained.

The extract was examined by thin layer chromatography using the procedure described by the European Brewery Convention (J. Inst Brewing, 1970, 76, 386) and the presence of only $\alpha$-acids and $\beta$-acids were revealed as two distinct spots when the plate was sprayed with methanolic ferric chloride reagent (1% w/v). When products, obtained by extracting hops with organic solvents are examined by this technique the chromatograms are normally complex and often consist of more than ten spots. The extract was shown to contain 56.7% of $\alpha$-acid when estimated by a conductometric procedure (J. Inst Brewing, 1970, 76, 343) using methanolic lead acetate. Hence 89.9% of the available $\alpha$-acids were extracted from the hops using liquid carbon dioxide. Examination of the extract by column chromatography on Sephadex (J. Inst Brewing, 1972, 78, 57) revealed that 83.0% of the $\beta$-acids present in the hops had been extracted.

Steam distillation of a 10 g portion of the extract using the procedure similar to that described by Howard (J. Inst Brewing, 1970, 76, 381) revealed that 66.7% of the available oil was extracted from the hops. When the extract (0.5gms) was shaken up with cold methanol (10 ml, $4°$ C.) a trace of white haze material was formed. However no oily droplets were formed and hence the extract was essentially free from fats and waxes, the haze being of no significance in that respect. The extract was completely soluble in light petroleum and hence free of hard resin.

EXAMPLE 2

Extraction of Hops without re-cycling of $CO_2$ 2.0 kg of powdered Comet hops containing 8.2% of $\alpha$-acids were placed in the column (5 cm ID × 180 cm) of an extraction apparatus generally is illustrated in FIG. 2. A stream of liquid dioxide was cooled to $-3°$ C. before entering the column. The flow rate was 15 kg/hour and the extraction was continued for 3 hours. The temperature of the hops inside the column was about 0° C. After 3 hours 276 g of extract had been obtained.

The extract was examined using the procedures described in Example 1 and the following results were obtained.
 (a) Only α-acids and β-acids were detected by thin layer chromotography.
 (b) 94.8% of the available α-acids and 76.2% of the available β-acids were extracted by the liquid carbon dioxide.
 (c) 70.3% of the available hop oil was present in the extract.
 (d) The extract was almost completely soluble in cold methanol and was essentially free of fatty and waxy material. The extract was completely soluble in light petroleum and was thus free of hard resins.

In the production of hop extracts using apparatus as illustrated in FIG. 2 of FIG. 3 the quality of the extract can be checked by taking a small sample of the extract at predetermined intervals and shaking it with cold methanol. When oily droplets, as distinct from a white haze, appears in the methanol the extraction should be stopped and the charge of hops discharged.

EXAMPLE 3

A series of extractions run under the general conditions described above in Examples 1 and 2 were performed at different temperatures on a series of hop cultivars. 2 Kg of hops were extracted on each run. The results at a given temperature were comparable from both methods and the quality of the product (especially with regard to the level of impurities) did not seem to depend strongly on which method was used. The analyses for α-acids, β-acids, hop oil and impurities were carried out as described in Example 1. The results are set out in Table 1 below.

Table 1

| Run No. | Variety Extracted | Extraction Temp °C. | Extraction Time Hrs. | Amount of Extract Obtained g | Amount of Extract Obtained wt % on Hops | % Available material extracted α-acids | % Available material extracted β-acids | % Available material extracted Hop oil | Amount of Organic Impurities[2] wt % |
|---|---|---|---|---|---|---|---|---|---|
| 1 | Northern Brewer | −20 | 4 | 258 | 12.9 | 61.7 | 84.9 | 67.9 | 16.8 |
| 2 | Northern Brewer | −10 | 3 | 266 | 13.3 | 76.2 | 70.1 | N.A.[1] | 4.3 |
| 3 | Wye Saxon | −5 | 3 | 282 | 14.1 | 89.9 | 83.0 | 66.7 | Trace[3] |
| 4 | Comet | 0 | 3 | 276 | 13.8 | 94.8 | 76.2 | 70.3 | Trace[3] |
| 5 | Wye Northdown | +10 | 4 | 288 | 14.4 | 91.8 | N.A.[1] | N.A.[1] | Trace[3] |
| 6 | Bullion | +15 | 4 | 318 | 15.9 | 100 | 91.2 | N.A.[1] | Trace[3] |

[1]No Analysis available
[2]Organic impurities mainly fats and waxes but include hard resins and uncharacterized soft resins especially at very low extraction temperatures.
[3]Analysis shows qualitative presence but amount so small that no precise quantitative estimate possible. Amount certainly <0.1%.

BREWING STUDIES

A comparison was made of the brewing performance of Wye Northdown hops and an extract made from a batch of the hops using liquid $CO_2$. The extract was made at 10° C. A portion of the extract (15 g), which contained 43.5% of α-acids, was added to wort (59 liters) at the start of boiling. A standard brewing procedure was followed (J. Amer. Soc. Brew. Chem. 1976, 34, 166). A similar beer was prepared using a portion of Wye Northdown hops (85 g) instead of the extract. The analytical values for the two beers were generally similar and are summarized in Table 2 below.

Table 2

| Hops Extract | Wort Bitterness (EBU) | Beer Bitterness (EBU) | Utilization (%) | Shelf-life (weeks) |
|---|---|---|---|---|
| Northdown Hops | 44 | 27 | 27.1 | 15 |
| Hop Extract | 43 | 28 | 27.2 | 25 |

The flavour of the two beers could not be distinguished using a 2-glass taste test.

What we claim is:

1. A method of making a high purity hop extract comprising α-acids, β-acids and hop oil, and having no more than 0.5% tannin and 0.5% hard resins, which consists essentially of passing liquid carbon dioxide at a temperature of from −5° C. to +15° C. through a column of hop material to extract at least a portion of the α-acids contained in the hops into the liquid carbon dioxide and subsequently evaporating the carbon dioxide, in equipment which is chemically inert to the extract, to thereby recover said hop extract of high purity.

2. The method as claimed in claim 1, wherein the temperature of extraction is about 0° C.

3. The method as claimed in claim 1, wherein the temperature of the extraction is about 10° C.

4. The method as claimed in claim 1, wherein the evaporated carbon dioxide is condensed and re-circulated through the column of hops.

5. The method as claimed in claim 1, wherein the column is substantially vertical and the liquid $CO_2$ is passed through the hops in the column in an upward direction.

6. The method as claimed in claim 5, wherein the ratio of length to diameter of the column is from 4 to 1 to 50 to 1.

7. A method of making a golden yellow, high purity hop extract which consists essentially of passing liquid carbon dioxide at a temperature of from −5° C. to +15° C. in an upward direction through a substantially vertical column of hop material, the ratio of length to diameter of the column being from 4 to 1 to 50 to 1, to extract at least a portion of the α-acids contained in the hops into the liquid carbon dioxide and subsequently evaporating the carbon dioxide, in equipment which is chemically inert to the extract, to thereby recover said golden yellow, high purity hop extract having the following composition in weight percent:-

α acids: 40 to 75
β acids: 20 to 40
Total resins (including α and β acids): 70 to 98

Hop oil: up to 10
Water: up to 5
Uncharacterized soft:
resins: up to 5
Hard resins: up to 0.5
Tannins: up to 0.5
Chlorophyll: up to 0.2

Fine solids: up to 0.5
Inorganic salts: up to 0.5

8. The high purity hop extract produced by the process of claim 1.

9. The high purity hop extract produced by the process of claim 7.

* * * * *